(12) United States Patent
Banta

(10) Patent No.: US 10,039,268 B2
(45) Date of Patent: Aug. 7, 2018

(54) COMB FORMATION GUIDE FOR PLACEMENT BETWEEN BEEHIVE FRAMES

(71) Applicant: John Charles Banta, Vacaville, CA (US)

(72) Inventor: John Charles Banta, Vacaville, CA (US)

( * ) Notice: Subject to any disclaimer, the term of this patent is extended or adjusted under 35 U.S.C. 154(b) by 186 days.

(21) Appl. No.: 14/954,900

(22) Filed: Nov. 30, 2015

(65) Prior Publication Data
US 2016/0157467 A1 Jun. 9, 2016

Related U.S. Application Data

(60) Provisional application No. 62/123,992, filed on Dec. 3, 2014.

(51) Int. Cl.
*A01K 47/06* (2006.01)

(52) U.S. Cl.
CPC ................... *A01K 47/06* (2013.01)

(58) Field of Classification Search
CPC ......... A01K 47/00; A01K 47/02; A01K 47/06
USPC .......................................... 449/3, 20, 64, 42
See application file for complete search history.

(56) References Cited

U.S. PATENT DOCUMENTS

| 141,443 | A | 8/1873 | Latchaw | |
|---|---|---|---|---|
| 349,078 | A | 9/1886 | Betsinger | |
| 540,479 | A | 6/1895 | Aspinwall | |
| 624,438 | A | 5/1899 | Crane | |
| 640,636 | A | 1/1900 | Danzenbaker | |
| 653,331 | A | | 7/1900 | Aspinwall |
| 846,396 | A | * | 3/1907 | Calvert et al. ......... A01K 47/02 |
| | | | | 449/42 |
| 891,584 | A | | 6/1908 | Aspinwall |
| 1,211,587 | A | * | 1/1917 | Jordan ................... A01K 47/00 |
| | | | | 449/42 |
| 1,321,601 | A | * | 11/1919 | Crease ................... A01K 47/02 |
| | | | | 449/42 |
| 1,348,925 | A | | 8/1920 | Baxter |

(Continued)

FOREIGN PATENT DOCUMENTS

KR    2014-0047755    4/2014

OTHER PUBLICATIONS

Bedford, George H., Slatted Clustering Space Under . . . to Prevent Swarming, Gleanings in Bee Culture, May 1, 1910, p. 299, vol. 38, No. 9, The A. I. Root Company, Medina, OH.

(Continued)

*Primary Examiner* — Lisa L Tsang

(57) ABSTRACT

One embodiment of a thin movable guide (30) consisting of a vertical panel (6) with hexagonal penetrations (8), and midribs (20) placed in the hive to bisect the hive while lying parallel with the comb frames (26) such that all components can be moved from or within the hive with a minimum of disturbance to the colony of bees housed therein. The guide (30) can be used singly or in multiples to maintain bee-space by inserting it between or in place of one or more of the frames (26). The device guides bees to produce regular shaped and spaced wax comb while permitting movement of bee castes between combs. When used side-by-side in groups (38) the guide (30) reduces tendencies for overcrowding leading to swarming while allowing the free movement of bees within the created space to keep the hive clean. Other embodiments are described as shown.

6 Claims, 6 Drawing Sheets

(56) References Cited

U.S. PATENT DOCUMENTS

| | | | |
|---|---|---|---|
| 1,410,444 A | | 3/1922 | Aspinwall |
| 1,637,002 A | * | 7/1927 | Koepp .................. A01K 47/02 449/37 |
| 1,773,221 A | * | 8/1930 | Davis .................... A01K 47/04 449/42 |
| 2,103,066 A | | 12/1937 | Engelbrektsson |
| 2,350,963 A | * | 6/1944 | Hinson .................. A01K 47/02 449/42 |
| 2,604,643 A | * | 7/1952 | Hamilton ............... A01K 47/02 449/42 |
| 2,919,450 A | * | 1/1960 | Singer ................... A01K 47/02 449/42 |
| 2013/0017759 A1 | | 1/2013 | Kunimune |

OTHER PUBLICATIONS

Colvin, Richard, The Italian Honey-Bee, House of Representatives, 1863, p. 533, 38th Congress, Ex. Doc. 91, U.S. Government Printing Office, Washington D.C.

Doolittle, G. M., My Experience with Separators, The American Bee Journal, Apr. 20, 1881, pp. 122, vol. 17, No. 16, Chicago, IL.

Doolittle, G. M., Shall We Use Separators?, The Progressive Bee-Keeper, Jan. 1, 1896, pp. 72-73, vol. 6, No. 1, Leahy Mfg. Company, Higgensville, MO.

Getaz, Adrian, Supers, Fences and Sections, The American Bee Journal, Sep. 6, 1906, pp. 755-757, vol. 46, No. 36, George W. York & Co., Chicago, IL.

Heddon, James, Separators for Surplus Honey, The American Bee Journal, Apr. 6, 1881, p. 106, vol. 17, No. 14, Chicago, IL.

Hutchinson, W. Z., Straight Combs Without Separators, American Bee Journal Weekly Bee Journal, Nov. 21, 1883, p. 594, vol. 19, No. 47, Thomas G. Newman, Chicago, IL.

Hutchinson, W. Z.,(moderator), Notes From the Michigan State Convention, Jan. 1884, Kansas Bee Keeper, pp. 10-11, vol. 4, No. 1, The Bee-keeper Pub. Co, Columbus, KS.

Miller, C. C., Fifty Years Among the Bees, 1911, p. 92-93, The A. I. Root Company, Medina, Ohio.

Pouder, Walter S., An Anti-swarming Device, Gleanings in Bee Culture, May 1, 1910, p. 295, vol. 38, No. 9, The A. I. Root Company, Medina, Ohio.

\* cited by examiner

COMB FORMATION GUIDE FOR PLACEMENT BETWEEN BEEHIVE FRAMES

CROSS-REFERENCE TO RELATED APPLICATIONS

This application claims the benefits of provisional patent application Ser. No. 62/123,992 filed Dec. 3, 2014 by the present inventor.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM, LISTING COMPACT DISC APPENDIX

Not Applicable

TECHNICAL FIELD

Bee Culture and more particularly—Perforated partitions with between frame placement.

BACKGROUND INFORMATION

When bees draw comb in tree hollows they fill all available areas until the available space has been utilized. These combs are curved and interlocked with uniformly spaced passageways throughout. The passageways have a uniform spacing referred to as "bee-space". The bee-space permits the three castes of bees (workers, drones, queens) to freely pass throughout all parts of the hive.

Although there are many variations on manufactured beehives the most common type of hive used for bee culture has movable frames. Beekeepers take measures to encourage the production of straight comb with a uniform width. Frequently the frames are provided with a foundation which acts as a template for the cell pattern and construction of straight comb. Even with foundation the comb frequently has sections where the width varies with over-built or under-built sections of comb.

Whenever a frame of honeycomb is over-built, it protrudes or bulges into the adjoining frame. The adjacent frame is therefore under-built, thin, and convex resulting in difficulty when disassembling or inspecting the hive. Forced removal of an interlocked section damages the comb and frequently kills quantities of bees. Beekeepers prevent this by monitoring and trimming comb to make it uniform and prevent it from becoming interlocked.

Trimming involves extra handling of frames and can interfere or slow down the inspection or honey harvest. Under-built sections are unable to be effectively uncapped. The under-built area of wax needs to be filled in order to have a uniform comb. The bees may repeatedly over-build the trimmed comb instead of completing the under-built comb. Repeated trimming may be needed by the beekeeper until the comb irregularities have been reduced, and regular shaped comb completely fills the frame.

Constructing comb is an energy intensive activity. Bees expend substantial amounts of carbohydrate in the form of nectar or supplied sugar water to produce the wax. It has been reported that the production of one pound of wax reduces honey production by eight pounds; therefore, when the beekeeper removes and discards misshapen comb there is a reduction in the amount of honey available for storage.

Some beekeepers allow comb construction without using foundation as a template. These beekeepers typically use a starter strip at the top-bar of the frame to direct comb building. The bees join together in an interlocking group that hangs from the starter strip down in a festoon. One problem is that bees frequently deviate from the starter strip when constructing foundationless comb. This results in severely crooked, or cross-comb positioned semi-perpendicular to the direction desired by the beekeeper. The misshapen comb locks the frames together so that removing frames can substantially damage the comb and kill many bees. Another obstacle when keeping bees is when they swarm.

In order to increase honey production beehives should have an ample number of bees; however, if the brood area of a hive becomes overcrowded it becomes more likely that the bees will swarm. This means there needs to be a balance between the number of bees in the hive and the available space. A swarming hive will have approximately half the bees leave with the existing queen bee to start a new colony. When managed hives swarm there is a reduction in the strength of the hive and the amount of honey available for harvest. Recapturing the swarm involves extra work. If the swarm can't be recaptured, it may invade buildings or other unwanted areas causing problems and the new colony is lost.

PRIOR ART

The following is a tabulation of some prior art that presently appears relevant:

| U.S. patents | | |
| --- | --- | --- |
| Pat. No. | Issue Date | Patentee |
| 141,443 | Aug. 5, 1873 | David Latchaw |
| 349,078 | Sep. 14, 1886 | Nicolas N. Betsinger |
| 540,479 | Jun. 4, 1895 | Lewis A. Aspinwall |
| 624,438 | May 2, 1899 | James K. Crane |
| 640,636 | Jan. 2, 1900 | Francis Danzenbaker |
| 653,331 | Jul. 10, 1900 | Lewis A. Aspinwall |
| 891,584 | Jun. 23, 1908 | Lewis A. Aspinwall |
| 1,410,444 | Mar. 21, 1922 | Lewis A. Aspinwall |

NON-PATENT LITERATURE DOCUMENTS

Doolittle, G. M., *The Progressive Beekeeper*, "My Experience with. Separators" (January 1896)

Getaz, A., *American Bee Journal*, "Supers, Fences and Sections" (Sep. 6, 1906).

Hutchinson, W. Z., *American Bee Journal*, "Straight Combs Without Separators" (November, 1883).

Hutchinson, W. Z. (panel discussion moderator), *Kansas Bee Keeper*, Notes from the Michigan State Convention (January, 1884)

Pouder, Walter S., *Gleanings in Bee Culture*, "An Anti-swarming Device" (1910).

In the late 1800's to early 1900's, beekeepers engaged in debate about the use of guides, partitions, fences, separators, and various in-hive dividers that would be inserted between frames to keep them straight and even. In August of 1873 David Latchaw (U.S. Pat. No. 141,443) patented removable guides for the comb frames. Latchaw's guides were made of "muslin or other similar fabric, dipped in melted bees-wax." He further described the guide as having apertures "to permit the bees to pass through from one frame to the other, and support themselves during the commencement of the comb-building." The apertures were limited in number resulting in the free movement of bees being obstructed. Nicolas Betsinger, September 1886 (U.S. Pat. No. 349,078) improved the use of perforated partitions by patenting a separator that was made up of a wire mesh, and its associated components, "permitting the passage of worker-bees therethrough". In spite of this improvement the device did not permit the free passage of all castes of bees. Other fence type separators were developed to assist in the production of comb-honey (Crane, U.S. Pat. No. 624,438, May 2, 1899) (Danzenbaker, U.S. Pat. No. 640,636, Jan. 2, 1900).

The use of separators was discussed in a panel discussion at a Michigan State Convention. Notes from this discussion were published in the January 1884 edition of the Kansas Bee Keeper. The Reverend Lorenzo Langstroth credited with being the father of modern beekeeping was quite critical of the use of separators. He stated that in 1860 he had performed experiments in creating straight comb using wooden separators he had constructed. When he introduced Italian bees to his hives with the separators he stated "they did little else between the separators, except to mope. If they did any work the combs were attached to the separators, were built in strips; in fact, they made the most horrible, bungling work imaginable, and I gave it up in disgust. Bees do not like separators."

Another type of between the frame separator or "dummy-frame" was invented by Luis Augustus Aspinwall. He recognized the importance of preventing overcrowding to preventing swarming. Aspinwall continued to work on solving the problem of swarming resulting in multiple patents and improved on his anti-swarming devices (U.S. Pat. No. 540,479, Jun. 4, 1895; U.S. Pat. No. 624,438, May 2, 1899; U.S. Pat. No. 653,331, Jul. 10, 1900; U.S. Pat. No. 891,584, Jun. 23, 1908; U.S. Pat. No. 1,410,444 Mar. 21, 1922). Aspinwall's frames provided a perception of having more room to expand the brood chamber, while in fact preventing the bees from doing so. The bees would instead expand their hive upward into the empty honey supers that were placed on top of the hive. Aspinwall's dummy-frames were constructed with wooden vertical slats set a bee-space distance apart. They were inserted into the hive in place of a frame that would be used for the bees to draw comb. The bees would enter the space created by the vertical slats which would relieve the overcrowding control comb-building in the bee-space areas reserved by the slats. A major drawback was the woodworking skill and time needed for constructing these frames.

In all of these past arts the passageways had limited success in maintaining the bee-space and guiding the construction of straight perfectly built comb. Rounded openings had non-uniform midribs that partially obstructed occupant passage throughout the hive and encouraged the construction of unwanted bridge comb. Square, rectangular or slot openings did not maintain a perfect bee-space. If the parallel side dimension provided a minimum bee-space, then the diagonal dimension would exceed bee-space resulting in comb being constructed into the opening. This comb construction at least partially blocked the separator preventing the free passage of bees. Rectangles or slots also caused the bees to construct strips of comb and bungle the construction as described by Rev. Langstroth.

SUMMARY OF THE EMBODIMENTS

The first embodiment relates to movable comb guides for directing and encouraging the placement of wax within frames to a controlled depth thereby preventing over-built and under-built combs. The guides are used between frames either with or without foundation.

The guide consists of a movable vertical partition with a matrix of hexagonal perforations. The guide is placed in the hive so it bisects the hive and lies in a plane parallel with the comb. Guide and comb can be moved separately or together within the hive providing minimal disturbance to the colony of bees housed therein. An aspect of the guide includes a top-bar or supporting structure. Another aspect of the guide includes optional spacers. Guide penetrations are sized to allow all castes of bees passage through the guide. The top-bar provides means for positioning the guide in the hive between the frames. Optional spacers are positioned to permit passage between the frames and ingress and egress between the hive boxes. Spacers also allow for rapid proper placement of the guide. The guides allows bees to use the midribs ladder-like and provides a side surface for helping support the weight of the bees when they festoon within frames. Grooves in the guide allow the user to cut and modify the size of the guide to fit various sized hives. The guide is used by placing it between one or more incomplete, empty, or irregularly shaped combs.

The hexagonal penetrations provide bee-space pathways that lit together in a perfectly spaced matrix where the midribs are identical in length and gauge so that the bees are assisted and not obstructed as they travel through the guide.

The advantages are demonstrated by the following operational aspects:

Bees will use the midribs of the panel ladder fashion to climb to the top and move throughout the hive box.

When guides are used to sandwich an empty frame (without foundation). Wax is deposited and formed into comb by bees festooning from the top of the empty frame downward. The bees will use the panel midribs to provide footing and help secure themselves in place during the comb construction process. In this way the weight of the festooned bees is partially distributed along the entire festoon instead of the entire weight of the lower portion of the festoon being borne by the bees at the frame top-bar.

The guide allows free movement along the plane of the constructed comb, and through the penetrations of the panel.

Pheromones which aid in honey bee communication can pass freely through the guide and permeate the hive.

The bees build the comb hanging from the starter strip with the comb construction stopping a bee-space short of reaching the guide. The guide provides a structure that serves to stop the bees from over-building the comb.

Under-built sections of comb will continue to have wax added to increase their depth until they are a bee-space away from the guide.

When the comb has been sufficiently built the guide can be removed and the bees will continue to maintain the comb with the appropriate bee-space to fit the frames. This permits easy removal and reinsertion of the guides and the frames thereby reducing the potential for bee death or injury.

Guides can be used as temporary splints so that damaged or transplanted comb repair is directed to produce straight and uniformly mended combs.

The guide can be used in multiples to providing space for bees to congregate to overcoming overcrowding. The panel is inserted between or in place of one or more of the brood frames. This configuration is used to reduce the tendency to swarm.

One or more guides can also he used in place of dummy-frames to prevent bees from building wax into spaces the beekeeper wants to reserve Without comb filling the space.

The guides allow the free movement of bees within the created space so they can keep the hive clean and defend against pest invasion into those spaces. Small dislodged pests will fall between two guides or between a guide and comb to the bottom of that hive where they can be ejected by guard bees. When used in combination with screened bottom boards small dislodged pests exit the hive by passing through the screen.

BRIEF DESCRIPTION OF THE SEVERAL VIEWS OF THE DRAWING

Other features and advantages of the embodiments will appear from the following description taken in connection with the drawings wherein.

DRAWINGS—REFERENCE NUMERALS

6 Guide Panel
8 Hole, Penetration
10 Top-bar, Supporting Structure
12 Spacer
14 Bottom Strip
16 Sizing Groove.
18 Side Strip
20 Midrib
22 Bee-space
24 Hive Box
26 Frame
28 Foundation
30 Guide
32 Queen
34 Worker
36 Drone
38 Grouping of Three Guides

DETAILED DESCRIPTION OF SPECIFIC EMBODIMENTS

Figure 1:
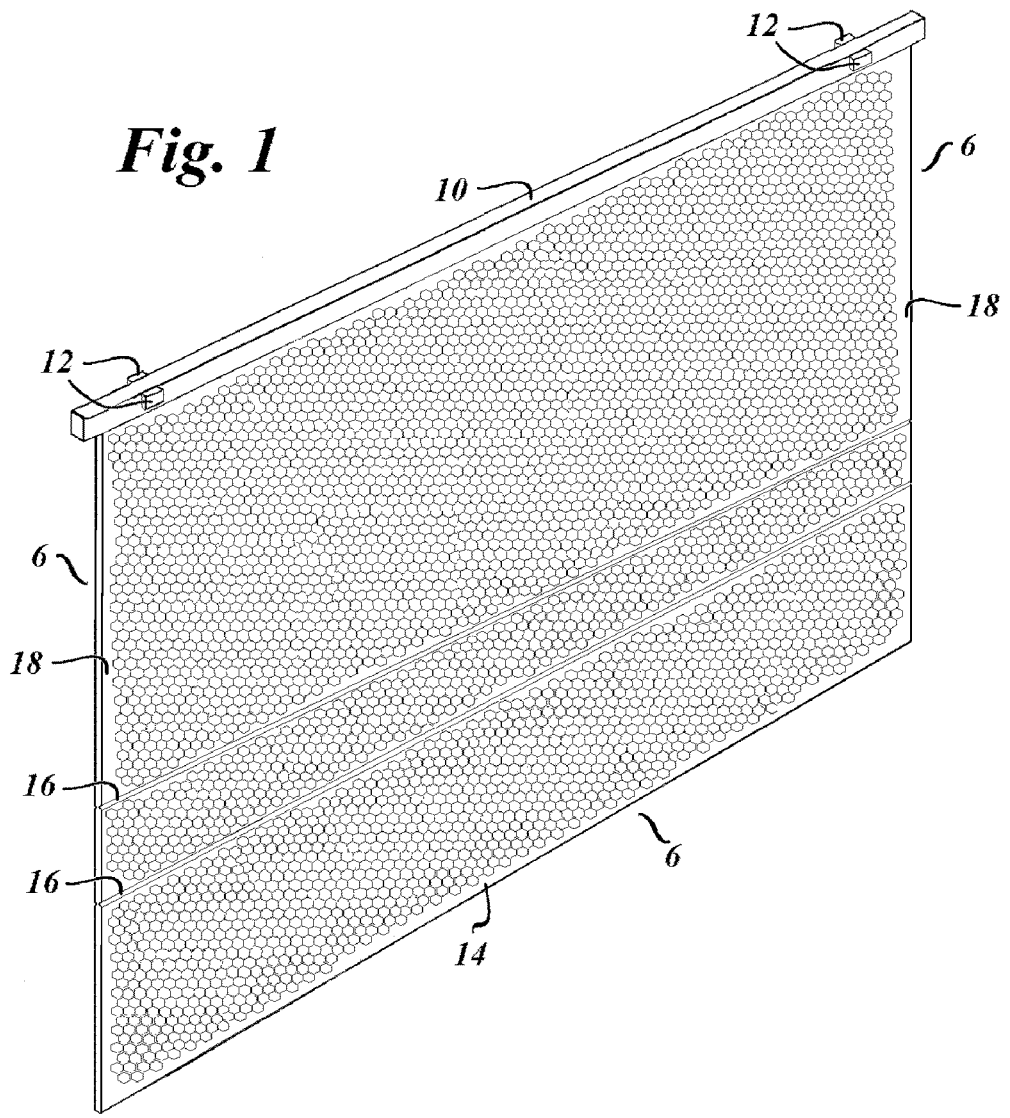
FIG. 1 is a schematic, top-front, perspective view of an embodiment of a guide.

Embodiments will now be described by way of example, with references to the accompanying drawings in which:

FIG. 1 shows a perspective view of an embodiment of the guide, fence, separator, or partition according to the present disclosure. In general terms, guide includes an optional top supporting structure, or top-bar 10, with optional spacers 12, and a vertical guide panel 6 hounded by optional reinforced side strips 18, an optional reinforced bottom strip 14 with optional sizing grooves 16. The guide is constructed so that said panel 6, top-bar 10, spacers 12, bottom strip 14, side strips 18, and grooves 16, when present, are a joined into a single unit.

Figure 1A:
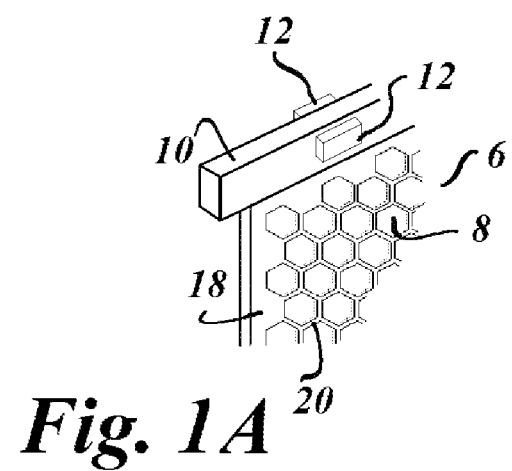
FIG. 1A is a schematic, enlarged, fragmentary, top-front, perspective view of FIG. 1.

FIG. 1A indicates a partial, close-up view of the upper portion of FIG. 1. Said panel 6 contains a matrix of reticulated hexagonal penetrations 8, separated by midribs 20. When present said top-bar 10, and spacers 12 provide means for supporting said guide in the chosen operating position. When present said side edges 18 provides vertical reinforcement.

Figure 1B:
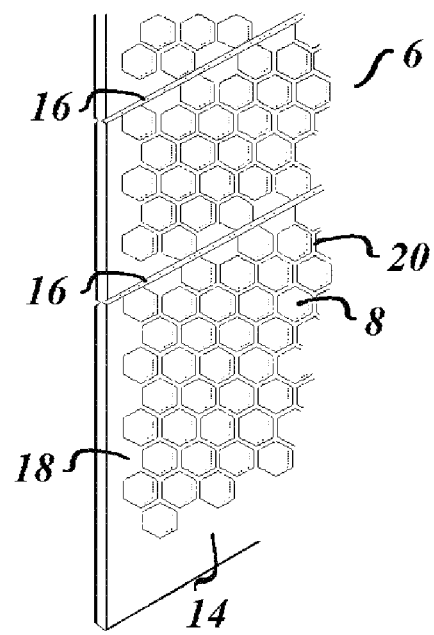
FIG. 1B is a schematic, enlarged, fragmentary, lower perspective view of FIG. 1.

FIG. 1B indicates a partial close-up view of the lower section of FIG. 1 including said sides 18, bottom edge 14, and guide panel 6, with penetrations 8, separated by midribs 20, and optional grooves 16 which allow the size of the guide to easily be modified by the user to fit various sized frames. Said grooves 16 permit the easy separation of unwanted portions of said panel 6 so that it can easily be modified by the user to fit the hive.

It is preferable to mold the guide of plastic or of a plastic with a filler and a binder, which is molded under heat and pressure to produce the frame guide sufficiently strong to withstand the normal handling use to which they are subjected so that the device can he reused indefinitely. A plastic such as polypropylene, polyethylene, PCV, ABS, HIPS or nylon can be used although alternative materials are possible. It is also possible for the guide to be produced using metal, or PLA (polylactic acid) or other fused deposition modeling materials.

Operation and Use

Figure 2:
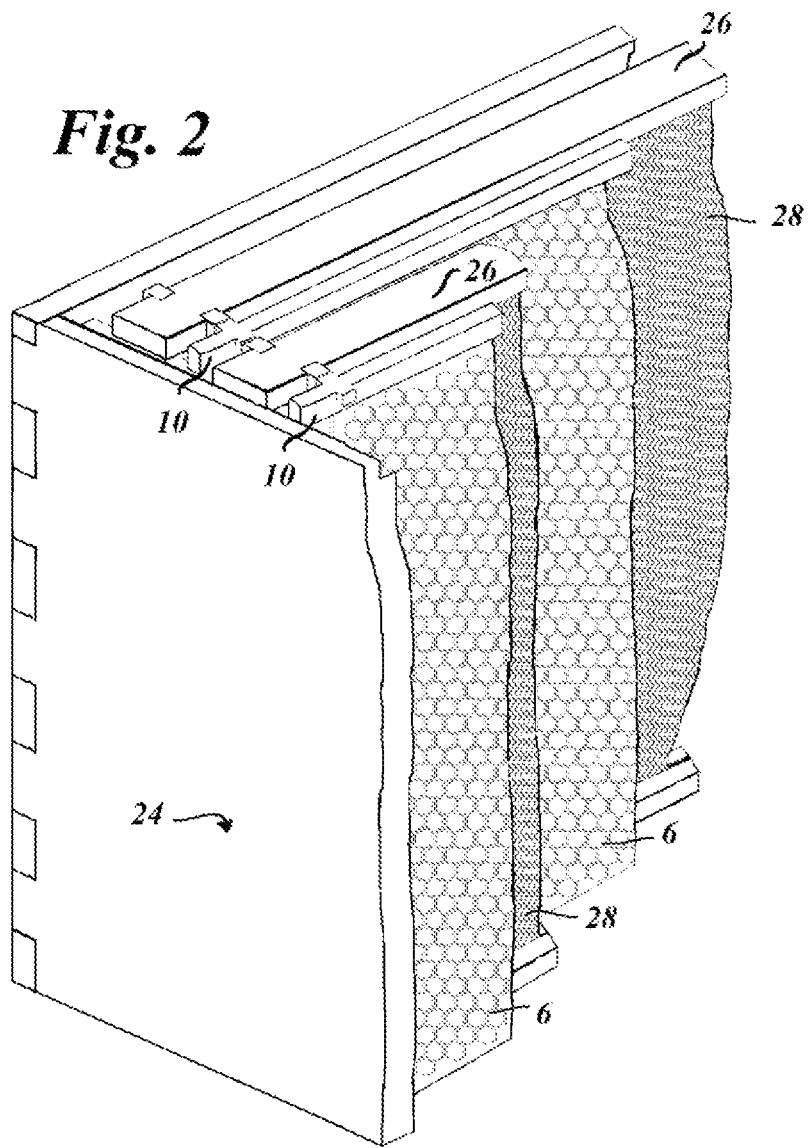
FIG. 2 is a schematic, fragmentary, top-front, perspective view of a hive box showing operationally positioned embodiments of said guide.

FIG. 2 is a cut-away of a hive body 24, showing a operationally positioned orientation of the hive frame 26, and foundation 28, to said panel 6. Furthermore the schematic shows the orientation of the top of the frame 26, to said top-bar 10. In typical use said panel 6, is positioned between frames 26, in a hive box 24, as shown. Frames 26, may have foundation 28, or a starter strip (not shown) at the top.

Figure 3:
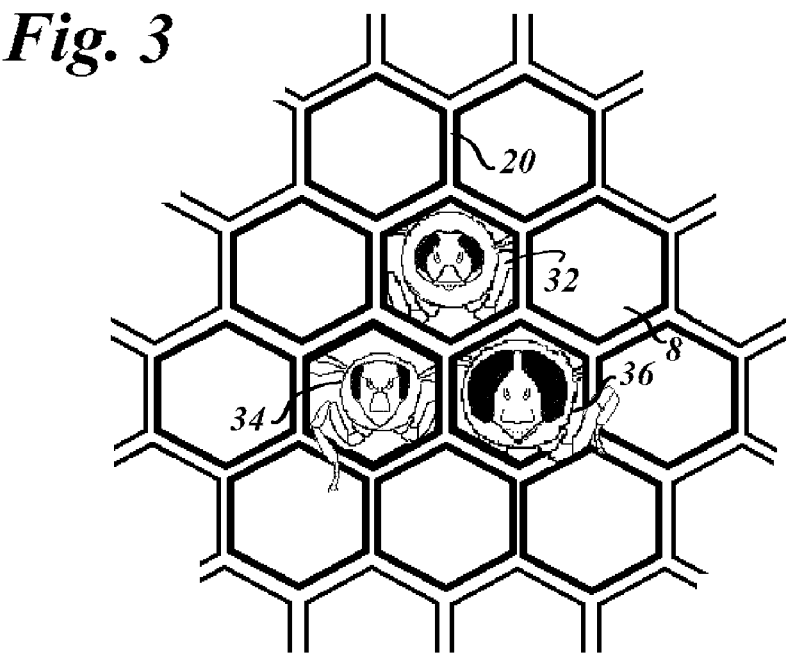
FIG. 3 is a schematic of the relative size of guide penetrations as compared to the queen, worker, and drone honeybee.

FIG. 3 shows a relationship between the panel penetrations 8, midribs 20 and relative size of the queen 32, worker 34 and drone 36 honeybee.

Operations and Use of Alternate Embodiments

Figure 4:
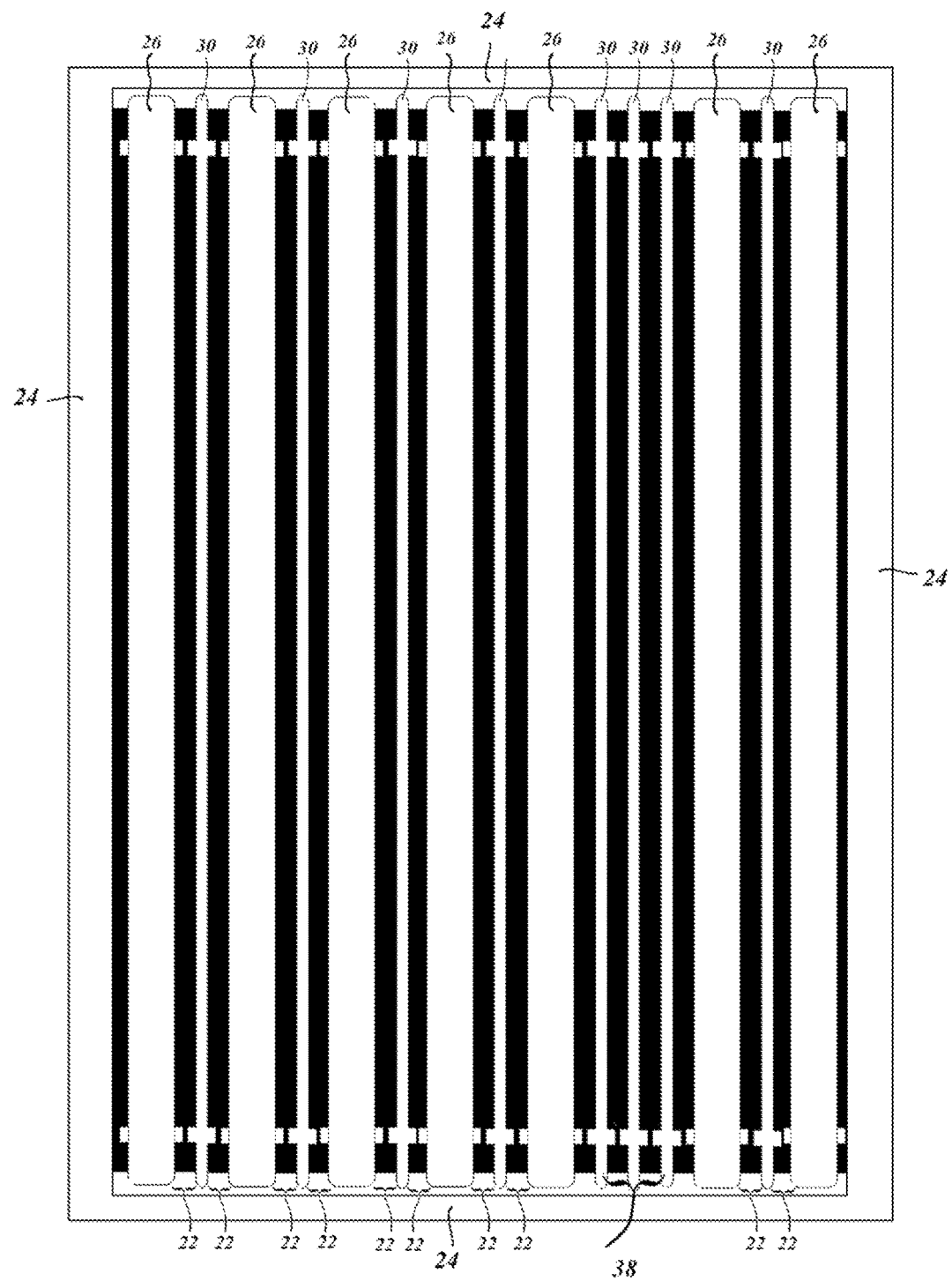
FIG. 4 is a schematic, top view of a hive box showing operationally positioned embodiments of said guide used singly between frames, and with three of said guides juxtaposed between frames.

Referring to FIG. 4 preferably three guides 30 can be used side-by-side 38 to create a spaciousness that will prevent the bees from over-crowding thus reducing the tendency to swarm. Each guide 30 is inserted into the hive to create bee-space separation between the frame 26 and guides 30. When said guides 30 are used side-by-side they create a bee-space 22 between each guide 30. To reduce swarming this embodiment preferably uses three guides 30 set side-by-side 38 preventing comb formation in the established space. Alternatively the guides 30 are inserted into the hive establishing bee-space between each component to direct comb production as desired by the beekeeper.

Thus the embodiments provide an improved method for directing and limiting comb production as well as the option to utilize grouped guides as a deterrent to swarming. Guides avoid interference with the free passage between and around adjacent frames and thus allows the bees and their pheromones to freely move throughout a hive. The embodiment maintains simplicity of use for beekeepers that is interchangeable, and can be reused indefinitely for multiple purposes. At present it is believed that these embodiment operates most efficiently, but the other embodiments are also satisfactory.

CONCLUSIONS, RAMIFICATIONS, AND SCOPE

Thus the reader will see that at least one embodiment of the guide provides a more useful, economical, time-saving device that can be used by beekeepers. Although the description above contains many specificities, these should not be construed as limiting the scope of the embodiments but as merely providing illustrations of some of several embodiments. For example, the overall shape of the guide panel can be hexagonal, trapezoidal, triangular, etc.; The top-bar can provide support by resting on top of the frames, the sides of the frames, or edges of the hive box, etc. Furthermore the top-bar can take a variety of shapes and be positioned in a variety of locations, etc. In addition the top-bar may be omitted and other support structures substituted. The spacers can take a variety of shapes and be positioned in a variety of locations, etc. The groove can be straight, curved or a variety of shapes to permit the user to modify the panel to fit between the frames in a variety of different sized and shaped hive boxes.

Thus the scope of the embodiments should be determined by the appended claims and their legal equivalents, rather than by the examples given.

What is claimed is:

1. A movable guide, separator, fence or partition comprising:
   a. an upright vertical planar panel of sufficient size and shape for interposing said panel between a beehive's walls or hive frames so as to be interleaved adjacent to said frames, or said walls; and
   b. a reticulated, grid-like pattern, made up of midribs set to form an array of regular hexagonal penetrations passing through said panel in a contiguous pattern; wherein the array of regular hexagonal penetrations provides unobstructed passage of all castes of honeybees and their pheromones throughout said beehive, whereby honeybees are guided to produce straight and even combs with bee-space passageways between adjacent said frames or said walls.

2. The guide of claim 1 wherein said panel has a supporting structure means for positioning said panel in said beehive.

3. The supporting structure of claim 2, or the guide, separator, fence or partition of claim 1, wherein said supporting structure or said guide, separator, fence or partition has a means for maintaining spacing of said panel in said beehive.

4. The guide of claim 1 wherein said panel further includes reinforcing side bars, bottom bars or other reinforcing structures to provide rigidity during use.

5. The guide of claim 1 wherein said panel is fashioned with a predetermined groove means for cutting said panel to fit various sizes of said beehive.

6. A movable guide, separator, fence or partition comprising:
   a. an upright vertical planar panel of sufficient size and shape for interposing said panel in groups of two or more between a beehive's walls or hive frames so as to be interleaved adjacent to said panels, said frames, or said walls; and
   b. a reticulated, grid-like pattern, made up of midribs set to form an array of regular hexagonal penetrations passing through said panel in a contiguous pattern; wherein the array of regular hexagonal penetrations provides unobstructed of all castes of honeybees and their pheromones throughout said beehive and reduces conditions that stimulate swarming behavior, whereby a comb-free area of the beehive is established to reduce overcrowding conditions within the beehive, resulting in a reduction in the tendency for honeybees to swarm.

* * * * *